(12) United States Patent
Stranberg et al.

(10) Patent No.: US 11,541,603 B2
(45) Date of Patent: Jan. 3, 2023

(54) SYSTEM FOR ADDITIVELY MANUFACTURING COMPOSITE STRUCTURE

(71) Applicant: Continuous Composites Inc., Coeur d'Alene, ID (US)

(72) Inventors: Nathan Andrew Stranberg, Post Falls, ID (US); Stephen Tyler Wilson, Coeur d'Alene, ID (US); Samuel VanDenBerg, Hayden, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 131 days.

(21) Appl. No.: 16/880,398

(22) Filed: May 21, 2020

(65) Prior Publication Data

US 2020/0376759 A1 Dec. 3, 2020

Related U.S. Application Data

(60) Provisional application No. 62/853,610, filed on May 28, 2019.

(51) Int. Cl.
*B29C 64/393* (2017.01)
*B33Y 10/00* (2015.01)
(Continued)

(52) U.S. Cl.
CPC ............ *B29C 64/393* (2017.08); *B22F 10/10* (2021.01); *B29C 64/106* (2017.08);
(Continued)

(58) Field of Classification Search
CPC ..... B29C 64/209; B29C 64/10; B29C 64/118; B29C 64/165; B29C 64/393;
(Continued)

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Joseph S Del Sole
*Assistant Examiner* — Mohamed K Ahmed Ali
(74) *Attorney, Agent, or Firm* — Ryan C. Stockett (57) ABSTRACT

A print head is disclosed for use in an additive manufacturing system. The print head may include an outlet configured to discharge a material, and a compacting device mounted to trail behind the outlet during movement of the print head in a normal direction. The print head may also include a spring configured to bias the compacting device against the material and to allow movement of the compacting device in a direction parallel with a discharge direction of the material through the outlet, and a locker configured to selectively lock a position of the compacting device relative to the outlet.

20 Claims, 5 Drawing Sheets

(51) Int. Cl.
| | |
|---|---|
| *B29C 64/241* | (2017.01) |
| *B33Y 50/02* | (2015.01) |
| *B29C 64/106* | (2017.01) |
| *B33Y 30/00* | (2015.01) |
| *B29C 64/209* | (2017.01) |
| *B29C 64/218* | (2017.01) |
| *B29C 64/236* | (2017.01) |
| *B29C 64/232* | (2017.01) |
| *B29C 64/227* | (2017.01) |
| *B29C 64/379* | (2017.01) |
| *B22F 10/10* | (2021.01) |

(52) U.S. Cl.
CPC .......... *B29C 64/209* (2017.08); *B29C 64/218* (2017.08); *B29C 64/241* (2017.08); *B33Y 10/00* (2014.12); *B33Y 30/00* (2014.12); *B33Y 50/02* (2014.12); *B29C 64/227* (2017.08); *B29C 64/232* (2017.08); *B29C 64/236* (2017.08); *B29C 64/379* (2017.08)

(58) Field of Classification Search
CPC ..... B29C 64/194; B29C 64/218; B29C 70/38; B29C 70/384; B29C 70/524
See application file for complete search history.

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0073730 A1* | 3/2012 | Van Nieuwenhove ...................... B29C 70/384 156/166 |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |

(56) References Cited

U.S. PATENT DOCUMENTS

| | | |
|---|---|---|
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1* | 2/2017 | Evans .................. B05D 3/068 |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0272627 A1* | 9/2018 | Tingle ................... B29C 70/384 |
| 2019/0351628 A1* | 11/2019 | Nishimura .............. B29C 70/30 |
| 2021/0229375 A1* | 7/2021 | Gaillard ................. B29C 70/54 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995). cited by applicant.

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

SYSTEM FOR ADDITIVELY MANUFACTURING COMPOSITE STRUCTURE

RELATED APPLICATION

This application is based on and claims the benefit of priority from U.S. Provisional Application No. 62/853,610 that was filed on May 28, 2019, the contents of which are expressly incorporated herein by reference.

TECHNICAL FIELD

The present disclosure relates generally to a manufacturing system and, more particularly, to a system for additively manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D® provides for increased strength, compared to manufacturing processes that do not utilize continuous fiber reinforcement, improvements can be made to the structure and/or operation of existing systems. For example, Applicant has found that greater control over compacting and curing of the reinforcement can improve reinforcement placement, strength, and accuracy. The disclosed additive manufacturing system is uniquely configured to provide these improvements and/or to address other issues of the prior art.

SUMMARY

In one aspect, the present disclosure is directed to a print head for an additive manufacturing system. The print head may include an outlet configured to discharge a material, and a compacting device mounted to trail behind the outlet during movement of the print head in a normal direction. The print head may also include a spring configured to bias the compacting device against the material and to allow movement of the compacting device in a direction parallel with a discharge direction of the material through the outlet, and a locker configured to selectively lock a position of the compacting device relative to the outlet.

In another aspect, the present disclosure is directed to another print head for an additive manufacturing system. This print head may include an outlet configured to discharge a material, and paddles disposed upstream of the outlet and located at opposing sides of the material. The print head may also include at least one actuator pivotally connected to the paddles.

In yet another aspect, the present disclosure is directed to another print head for an additive manufacturing system. This print head may include an outlet configured to discharge a material, and a compactor located at a trailing side of the outlet relative to a normal travel direction of the print head. The compactor may have at least one roller, a guide, and a source of cure energy. The compactor may further include a belt wrapped around the at least one roller and guide, the belt being at least partially transparent to the cure energy.

DETAILED DESCRIPTION

Figure 1:
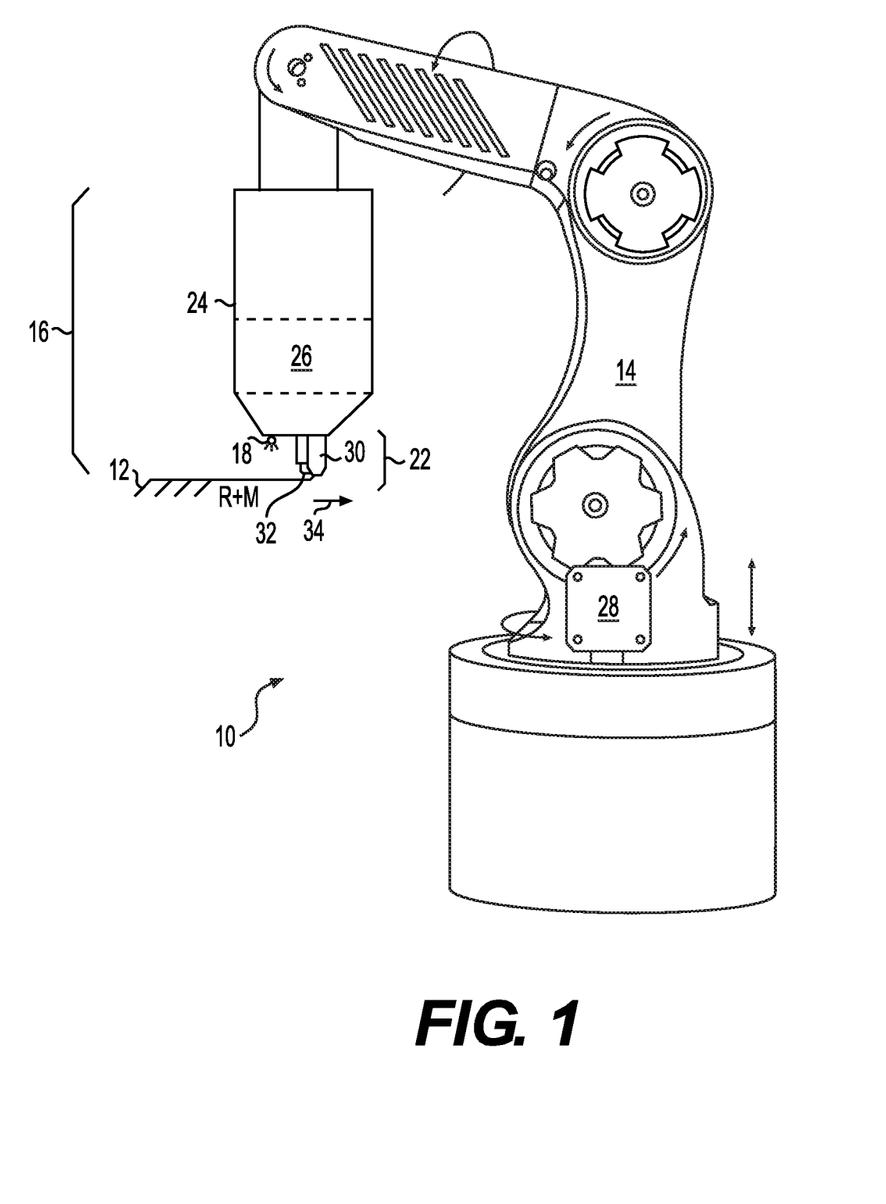
FIG. 1 is a diagrammatic illustration of an exemplary disclosed additive manufacturing system.

FIG. 1 illustrates an exemplary system 10, which may be used to manufacture a composite structure 12 having any desired shape. System 10 may include a support 14 and a deposition head ("head") 16. Head 16 may be coupled to and moved by support 14. In the disclosed embodiment of FIG. 1, support 14 is a robotic arm capable of moving head 16 in multiple directions during fabrication of structure 12. Support 14 may alternatively embody a gantry (e.g., an overhead-bridge gantry or a single-post gantry) or a hybrid gantry/arm also capable of moving head 16 in multiple directions during fabrication of structure 12. Although support 14 is shown as being capable of 6-axis movements relative to structure 12, it is contemplated that support 14 may be capable of moving head 16 in a different manner (e.g., along and/or around a greater or lesser number of axes). It is also contemplated that structure 12 could be associated with one more movement axis and configured to move independent of and/or in coordination with support 14. In some embodiments, a drive may mechanically couple head 16 to support 14, and include components that cooperate to move portions of and/or supply power or materials to head 16.

Head 16 may be configured to receive or otherwise contain a matrix (shown as M). The matrix may include any types or combinations of materials (e.g., a liquid resin, such as a zero-volatile organic compound resin, a powdered metal, etc.) that are curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized (e.g., positively and/or negatively), for example by an external device (e.g., by an extruder, a pump, etc.—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16, and pushed or pulled out of head 16 along with one or more continuous reinforcements (shown as R). In some instances, the matrix inside head 16 may need to be kept cool and/or dark in order to inhibit premature curing or otherwise obtain a desired rate of curing after discharge. In other instances, the matrix may need to be kept warm and/or illuminated for similar reasons. In either situation, head 16 may be specially configured (e.g., insulated, temperature-controlled, shielded, etc.) to provide for these needs.

The matrix may be used to at least partially coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within or otherwise passed through head 16. When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, plastic fibers, metallic fibers, optical fibers (e.g., tubes), etc. It should be noted that the term "reinforcement" is meant to encompass both structural and non-structural (e.g., functional) types of continuous materials that are at least partially encased in the matrix discharging from head 16.

The reinforcements may be at least partially coated with the matrix while the reinforcements are inside head 16, while the reinforcements are being passed to head 16, and/or while the reinforcements are discharging from head 16. The matrix, dry (e.g., unimpregnated) reinforcements, and/or reinforcements that are already exposed to the matrix (e.g., pre-impregnated reinforcements) may be transported into head 16 in any manner apparent to one skilled in the art. In some embodiments, a filler material (e.g., chopped fibers, nano particles or tubes, etc.) and/or additives (e.g., thermal initiators, UV initiators, etc.) may be mixed with the matrix before and/or after the matrix coats the continuous reinforcements.

One or more cure enhancers (e.g., a UV light, an ultrasonic emitter, a laser, a heater, a catalyst dispenser, etc.) 18 may be mounted proximate (e.g., within, on, and/or adjacent) head 16 and configured to enhance a cure rate and/or quality of the matrix as it is discharged from head 16. Cure enhancer 18 may be controlled to selectively expose portions of structure 12 to energy (e.g., UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, solidify the matrix, polymerize the matrix, or otherwise cause the matrix to cure as it discharges from head 16. The amount of energy produced by cure enhancer 18 may be sufficient to cure the matrix before structure 12 axially grows more than a predetermined length away from head 16. In one embodiment, structure 12 is at least partially (e.g., completely) cured before the axial growth length becomes equal to an external diameter of the matrix-coated reinforcement.

The matrix and/or reinforcement may be discharged together from head 16 via any number of different modes of operation. In a first example mode of operation, the matrix and/or reinforcement are extruded (e.g., pushed under pressure and/or mechanical force) from head 16 as head 16 is moved by support 14 to create features of structure 12. In a second example mode of operation, at least the reinforcement is pulled from head 16, such that a tensile stress is created in the reinforcement during discharge. In this second mode of operation, the matrix may cling to the reinforcement and thereby also be pulled from head 16 along with the reinforcement, and/or the matrix may be discharged from head 16 under pressure along with the pulled reinforcement. In the second mode of operation, where the reinforcement is being pulled from head 16, the resulting tension in the reinforcement may increase a strength of structure 12 (e.g., by aligning the reinforcements, inhibiting buckling, equally loading the reinforcements, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor point (e.g., a print bed, an existing surface of structure 12, a fixture, etc.). For example, at the start of structure formation, a length of matrix-impregnated reinforcement may be pulled and/or pushed from head 16, deposited against the anchor point, and at least partially cured, such that the discharged material adheres (or is otherwise coupled) to the anchor point. Thereafter, head 16 may be moved away from the anchor point, and the relative movement may cause the reinforcement to be pulled from head 16. As will be explained in more detail below, the movement of reinforcement through head 16 may be selectively assisted via one or more internal feed mechanisms, if desired. However, the discharge rate of reinforcement from head 16 may primarily be the result of relative movement between head 16 and the anchor point, such that tension is created within the reinforcement. As discussed above, the anchor point could be moved away from head 16 instead of or in addition to head 16 being moved away from the anchor point.

Head 16 may include, among other things, an outlet 22 and a matrix reservoir 24 located upstream of outlet 22. In one example, outlet 22 is a single-channel outlet configured to discharge composite material having a generally circular, tubular, or rectangular cross-section. The configuration of head 16, however, may allow outlet 22 to be swapped out for another outlet that simultaneously discharges multiple channels of composite material having the same or different shapes (e.g., a flat or sheet-like cross-section, a multi-track cross-section, etc.). Fibers, tubes, and/or other reinforcements may pass through matrix reservoir 24 (e.g., through one or more internal wetting mechanisms 26 located inside of reservoir 24) and be wetted (e.g., at least partially coated, encased, and/or fully saturated) with matrix prior to discharge.

Outlet 22 may take different forms. In one example, a guide or nozzle 30 is located downstream of wetting mechanism 26, and a compactor 32 trails nozzle 30 (e.g., relative to a normal travel direction of head 16 during material discharge, as represented by an arrow 34). It is contemplated that either of nozzle 30 or compactor 32 may function as a tool center point (TCP) of head 16, to affix the matrix-wetted reinforcement(s) at a desired location prior to and/or during curing when exposed to energy by cure enhancer(s) 18. It is also contemplated that nozzle 30 and/or compactor 32 may be omitted, in some embodiments. Finally, it is contemplated that the TCP of head 16 may not necessarily be associated with nozzle 30 or compactor 32 and instead be a location of cure energy exposure that is separate from these locations. The TCP may also switch locations in some applications.

One or more controllers 28 may be provided and communicatively coupled with support 14 and head 16. Each controller 28 may embody a single processor or multiple processors that are programmed and/or otherwise configured to control an operation of system 10. Controller 28 may include one or more general or special purpose processors or microprocessors. Controller 28 may further include or be associated with a memory for storing data such as, for example, design limits, performance characteristics, operational instructions, tool paths, and corresponding parameters of each component of system 10. Various other known circuits may be associated with controller 28, including power supply circuitry, signal-conditioning circuitry, solenoid driver circuitry, communication circuitry, and other appropriate circuitry. Moreover, controller 28 may be capable of communicating with other components of system 10 via wired and/or wireless transmission.

One or more maps may be stored within the memory of controller 28 and used during fabrication of structure 12. Each of these maps may include a collection of data in the form of lookup tables, graphs, and/or equations. In the disclosed embodiment, the maps may be used by controller 28 to determine movements of head 16 required to produce desired geometry (e.g., size, shape, material composition, performance parameters, and/or contour) of structure 12, and to regulate operation of cure enhancer(s) 18 and/or other related components in coordination with the movements.

Figure 2:
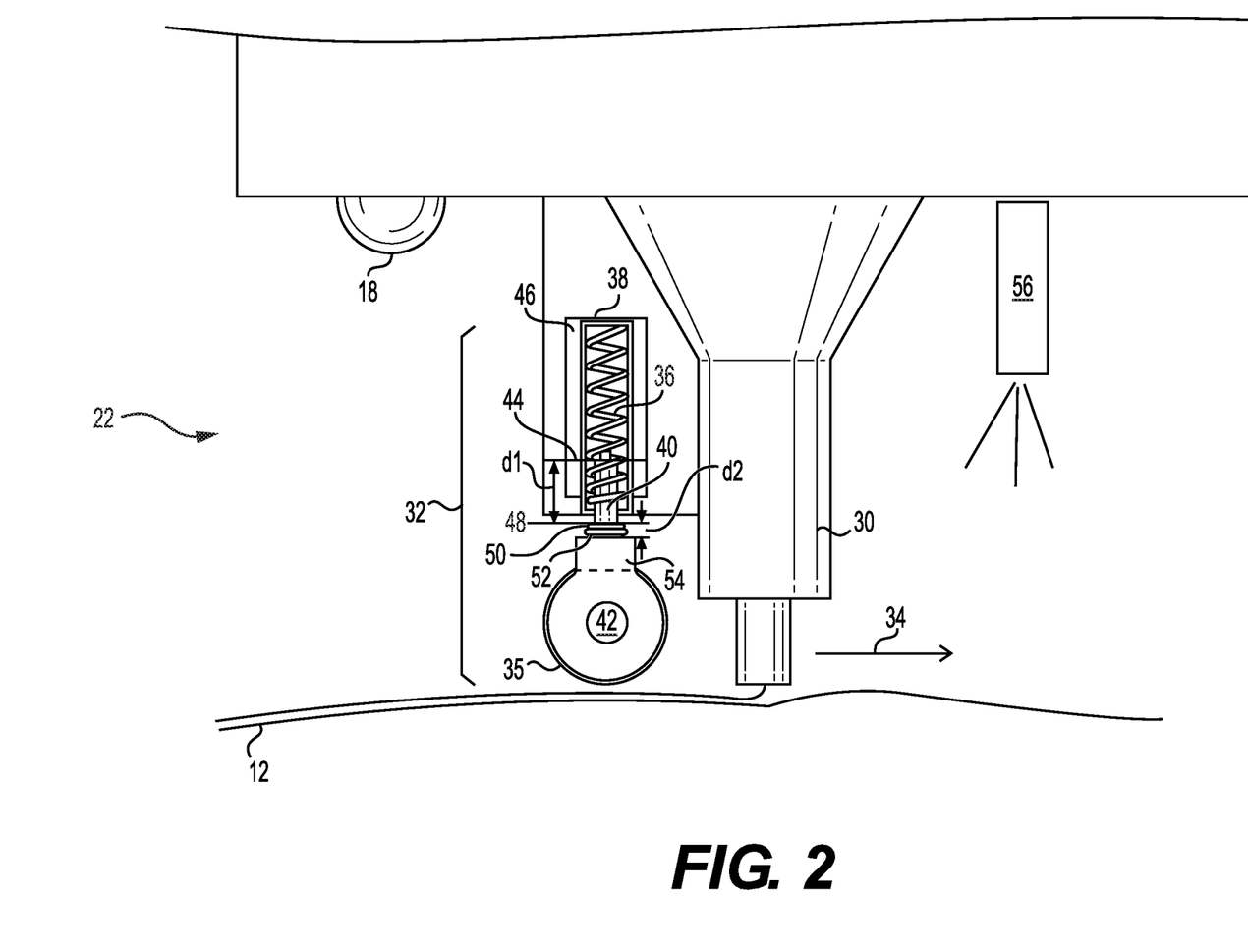
FIGS. 2 and 3 are diagrammatic illustrations of exemplary disclosed outlets that may each form a portion of the system of FIG. 1.

An exemplary outlet 22 is illustrated in FIG. 2. As shown in this figured, compactor 32 may include a compacting device (e.g., a wheel) 35 that is biased against the matrix-coated reinforcement (R+M) via a spring 36. Spring 36 may be disposed within a housing 38 and configured to exert an axially extending force on compacting device 35 via one or more pistons 40 that protrude at least partially in housing 38. In the disclosed embodiment, compacting device 35 is generally cylindrical and oriented orthogonally relative to a central axis of nozzle 30, with one piston 40 located at each opposing end and extending parallel with the central axis. Each piston 40 may be connected to compacting device 35 via a corresponding bearing 42.

In the disclosed embodiment, a movement of piston 40 (e.g., retracting into and/or extending out of housing 38) may be limited. For example, a first limiter 44 may be positioned near an internal end of piston 40 and configured to slide in an axial direction of piston 40 within corresponding slots 46. As piston 40 extends from housing 38, limiter 44 may near closed ends of slots 46, thereby inhibiting further extension. In another example, a second limiter 48 may be positioned around piston 40 at a location outside of housing 38. As piston 40 retracts into housing 38, limiter 48 may near an outer surface (e.g., a collar sized to receive piston 40 but block limiter 48) of housing 38, thereby inhibiting further retraction. It is contemplated that only one or both of first and second limiters 44, 48 may be utilized at the same time in conjunction with compactor 32, as desired. These limiters may allow compacting device 35 to extend through a range of distances in the Z-direction, thereby compacting most surfaces of the discharging material while at the same time maintaining an outer surface of structure 12 within an acceptable location zone. This location zone may help to reduce error buildup and provide structure 12 with tighter tolerances.

In some applications, it may be beneficial to selectively adjust the edge location and/or extension range of the location zone. For example, the zone may be adjusted in a Z-direction (e.g., the axial direction of nozzle 30) relative to the discharge location of head 16. Additionally or alternatively, the zone may be made thicker or thinner. This may allow for variable compaction of the discharging material and tolerance control at the same time.

To facilitate this functionality, the location of limiter 44 and/or 48 relative to each other and/or relative to compacting device 35 may be moveable. For example, an effective length of pistons 40 may be adjustable by way of a threaded connection 50 of pistons 40 with bearings 42. Specifically, pistons 40 may be unscrewed from bearings 42 (from an associated bearing housing) or screwed in further at connection 50 to make a distance $d_1$ shorter or longer. Similarly, a position of limiter 48 relative to compacting device 35 and/or relative to limiter 44 may be adjustable by way of another threaded connection 52, such that unscrewing or screwing in of limiter 48 at connection 52 may make a distance $d_2$ shorter or longer. These adjustments may be made manually or automatically (e.g., via an associated actuator, such as one or more optional motors 54), as desired. It is contemplated that other types of actuators (e.g., hydraulic actuators, solenoids, etc.) may be used to automatically adjust $d_1$ and/or $d_2$, if desired.

In embodiments where the adjustment of $d_1$ and/or $d_2$ are implemented automatically, the changes may be based on actual surface characteristics of structure 12 (e.g., as discharged during a previous fabrication pass). These characteristics may be detected in real time, for example via one or more sensors (e.g., cameras, infrared sensors, acoustic sensors, etc.—not shown) 56 located at a leading side of nozzle 30 (e.g., opposite compactor 32). Additionally or alternatively, the changes may be based on a fabrication plan for structure 12. For example, based on a need to create a void within structure 12 (e.g., for placement of a fastener or generation of a conduit), the location zone may be temporarily extended in the Z-direction toward structure 12 and/or made thicker. In another example, at a known point of reinforcement overlap (e.g., an intersection or other protruding anomaly), the location zone may be temporarily retracted and/or thinned to maintain the protrusion or extended and/or thickened to reduce the protrusion.

It may be beneficial, in some applications, to selectively lock motion (e.g., axial motion, rotational motion, and/or all motion) of compactor 32 to the rest of outlet 22. For example, when transitioning from compacting of an overlapping layer to printing in free-space, it may be desirable to lock compacting device 35 at a fixed axial position relative to nozzle 30, such that spring 36 does not suddenly extend compacting device 35 and cause a stepwise shift in the TCP location as compactor 32 is lifted away from the underlying layer. This locking may be accomplished, for example, by controller 28 reducing $d_1$ to zero.

Figure 3:
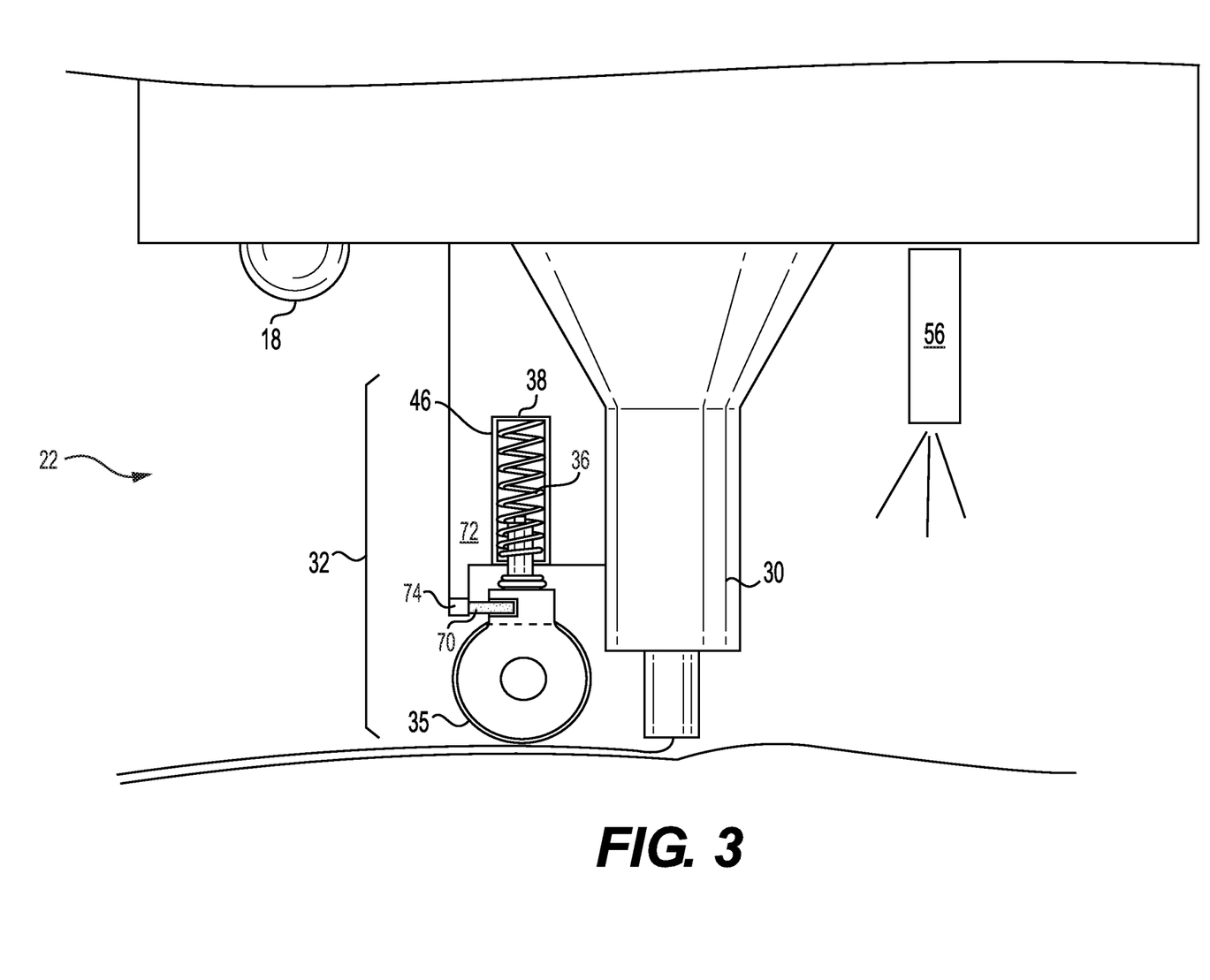

FIG. 3 illustrates an alternative or additional way to axially lock compactor 32 at a fixed location. As shown in this figure, a separate and dedicated locker (e.g., a pin) 70 may be configured to mechanically fix compacting device 35 to the rest of outlet 22 (e.g., directly, or indirectly via a bracket 72). Locker 70 may be moved (e.g., slid and/or rotated) from device 35 into a slot located within nozzle 30 and/or bracket 72 by way of an actuator 74 that is regulated by controller 28. It is contemplated that a reverse action (e.g., movement of locker 70 into a slot formed within device 35) may additionally or alternatively be implemented.

Figure 4:
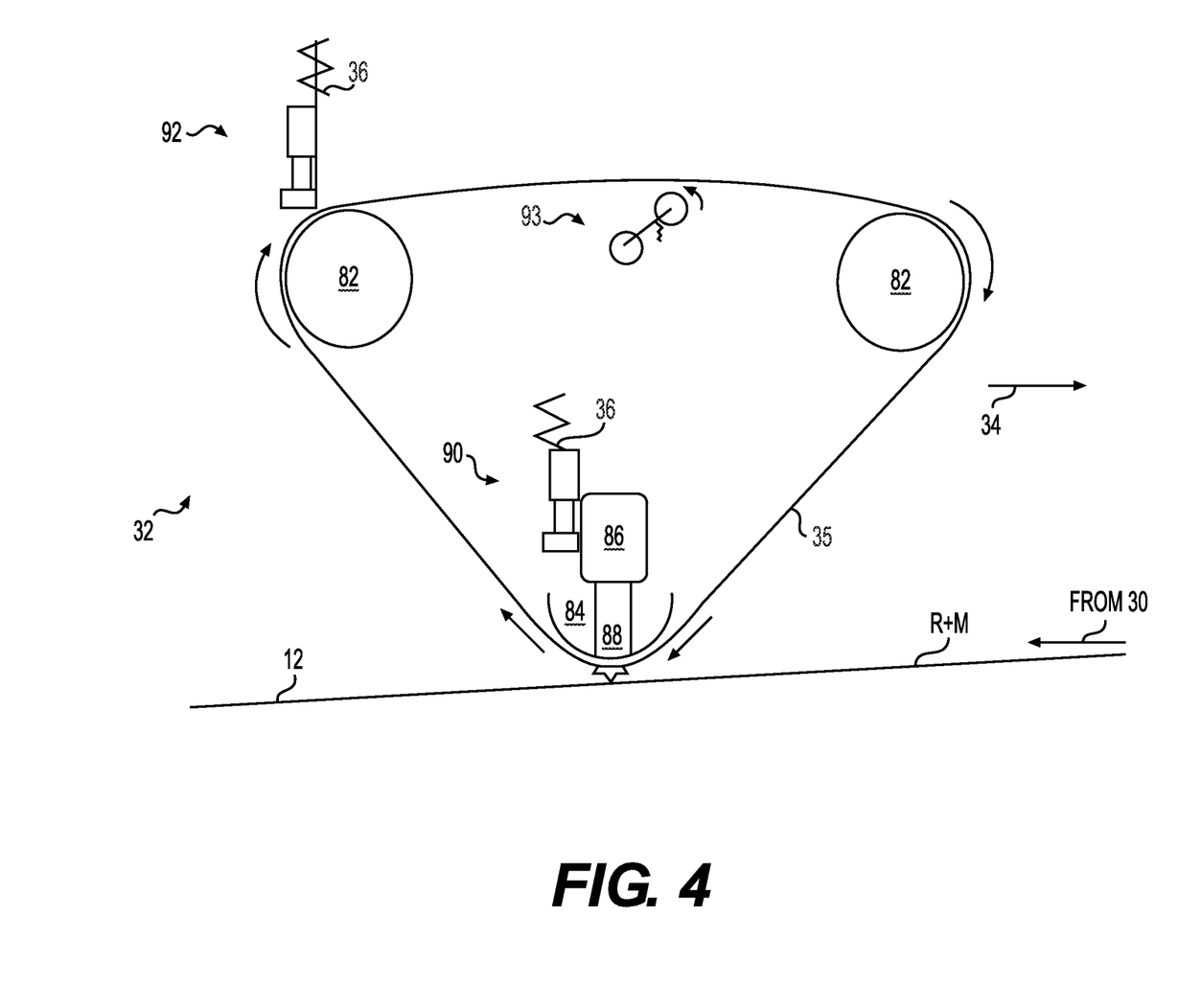
FIG. 4 is a diagrammatic illustration of an exemplary disclosed compactor that may form a portion of the outlet of FIG. 2.

An alternative embodiment of compactor 32 is depicted in FIG. 4. As shown in this figure, compacting device 35 may embody a belt that is at least partially transparent to cure energy. The belt may be wrapped around one or more rollers 82 (e.g., two, three, or four rollers 82), which may or may not be driven, and a guide (e.g., a centrally located guide) 84. Cure energy may be directed from a source 86 through a conduit 88 in guide 84 and through the transparent belt to expose and cure the matrix coating the reinforcement at an opposing side of the belt. Guide 84 may be a cylindrical, spherical, or other shaped roller, partial roller, or fixed sliding surface and located at the outlet of conduit 88 to help guide the belt past the outlet. It is contemplated that any number of guides 84 may be arranged adjacent each other across a width of the belt, if desired, for use in curing the matrix coating any number of adjacent reinforcements. A tensioner 93 may be associated with the belt of compactor 32 and positioned at any location (e.g., between rollers 82) along its length, as desired.

Although compactor 32 is shown in FIG. 4 as having a general arrowhead shape, with a point of the arrow pointed towards the matrix-coated reinforcement, other orientations and/or shapes may also be possible. For example, the arrowhead shape could be inverted, such that a flat base side of the arrowhead rides along the matrix-coated reinforcement. In this embodiment, guide 84 could be located at a leading end of the flat side, at a trailing end, or at some point between the leading and trailing ends. In another example, additional rollers 82 may be utilized and placed adjacent guide 84 to form a generally rectangular or diamond shape.

In some embodiments, guides 84 may be individually position-adjustable (e.g., via one or more linear actuators 90), such that a transverse shape of the belt may be manipulated. Similar to the embodiment of FIG. 2, all of compactor 32 of FIG. 4 may also be adjustable in the Z-direction (e.g., via a linear and/or rotary actuator 92), if desired.

Compactor 32 of FIG. 4 may be located at a fixed axial position relative to the rest of outlet 22 and/or be biased by spring 36 within a limited range of motion. For example, an additional spring 36 could be located to bias all of compactor 32 towards the matrix-coated reinforcement or to bias guide 84 relative to rollers 82.

In some embodiments, an amount of back-tension within the reinforcement inside of head 16 may be too high (e.g., due to friction). High levels of tension can cause damage to the reinforcements and/or cause structure 12 to move undesirably during fabrication. For example, a newly discharged track of material can be pulled off structure 12, if the tension is too high during curing. For these reasons, it can be important to reduce tension within head 16. This can be facilitated with the use of one or more feed mechanisms placed anywhere upstream of a discharge location (e.g., nozzle 30) of head 16 (e.g., inside of and/or upstream of head 16).

Conventional feed mechanisms include opposing rollers that sandwich the reinforcement therebetween, wherein at least one of the rollers is driven to rotate by a motor. It has been found that conventional feed rollers can create high pressure along a line of contact between the opposing rollers. This high pressure can cause damage to the reinforcements and also press out too much matrix. In addition, reinforcements that have been wetted with matrix tend to stick to the rollers, causing jams within head 16.

Figure 5:
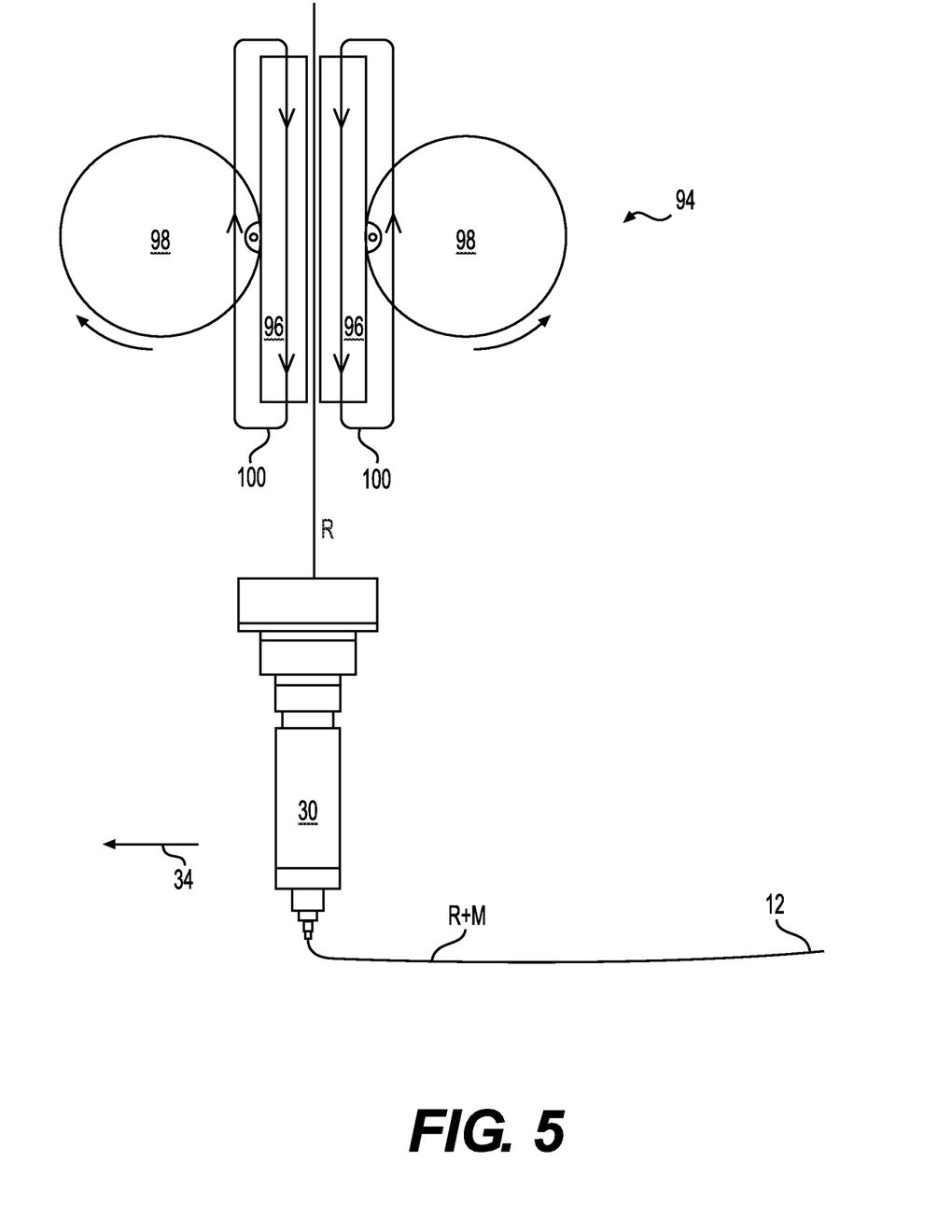
FIG. 5 is a diagrammatic illustration of an exemplary disclosed reinforcement feeder that may form a portion of the system of FIG. 1.

An exemplary feed mechanism 94 designed to address one or more of the issues of conventional feed rollers is illustrated in FIG. 5. As can be seen in this figure, mechanism 94 may include tracks or paddles 96 located at opposing sides of the reinforcement, and one or more actuators 98 configured to move paddles 96 in a cyclical manner Paddles 96 may each include generally planar inner surfaces that are moved by actuators 98 to sandwich the reinforcement therebetween. Paddles 96 may be elongated in an axial direction of the reinforcement and have transverse widths that extend past the reinforcement at both opposing edges. An engagement area of paddles 96 may be selected to exert a desired pressure on the reinforcement that creates sufficient friction to advance the reinforcement in the axial direction without causing damage to the reinforcement. Actuators 98 may be rotary-type actuators (e.g., electric, pneumatic, and/or hydraulic motors) that each include a cam, pulley, or similar feature pivotally connected to paddles 96 at an outer periphery. Alternatively, actuators 98 may include linear actuators connected to paddles via a linkage arrangement (not shown). During operation of actuators 98, paddles 96 may be caused to follow a circular, ellipsoidal, and/or rectangular trajectory (represented by arrows 100). This trajectory may include a segment during which paddles 96 sandwich and advance the reinforcement, and a segment during which paddles 96 are separated from each other and resetting for a next advancement segment. Because paddles 96 separate from each other by movement away from the reinforcement in an orthogonal direction, the reinforcement may not wrap around and stick to any part of paddles 96.

In some applications, compliance between paddles 96 may be helpful. For example, the compliance may provide a reliable level of pressure exerted by paddles 96 on the reinforcement therebetween. The compliance may be provided, for example, via a compliant material (e.g., foam, rubber, etc.) applied to the inner or engagement surfaces of paddles 96. Alternatively or additionally, paddles 96 may be linked to the pivot connection points of actuators 98 via a spring that urges paddles 96 towards each other. Other configurations may also be possible.

INDUSTRIAL APPLICABILITY

The disclosed system may be used to manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 28 that is responsible for regulating operations of support 14 and/or head 16). This information may include, among other things, a size (e.g., diameter, wall thickness, length, etc.), a contour (e.g., a trajectories, surface normal, etc.), surface features (e.g., ridge size, location, thickness, length; flange size, location, thickness, length; etc.), connection geometry (e.g., locations and sizes of couplings, tees, splices, etc.), reinforcement selection, matrix selection, discharge locations, curing specifications, compaction specifications, etc. It should be noted that this information may alternatively or additionally be loaded into system 10 at different times and/or continuously during the manufacturing event, if desired. Based on the component information, one or more different reinforcements and/or matrix materials may be installed and/or continuously supplied into system 10.

To install the reinforcements, individual fibers, tows, and/or ribbons may be passed through matrix reservoir 24 and outlet 22 (e.g., through feed mechanism 94, through features of nozzle 30, and under compactor 32). Installation of the matrix material may include filling head 16 (e.g., wetting mechanism 26 of reservoir 24) and/or coupling of an extruder (not shown) to head 16.

The component information may then be used to control operation of system 10. For example, the in-situ wetted reinforcements may be pulled and/or pushed from outlet 22 of head 16 as support 14 selectively moves (e.g., based on known kinematics of support 14 and/or known geometry of structure 12), such that the resulting structure 12 is fabricated as desired.

Operating parameters of support 14, cure enhancer(s) 18, compactor 32, feed mechanism 94, and/or other components of system 10 may be adjusted in real time during material discharge to provide for desired bonding, strength, tension, geometry, and other characteristics of structure 12. Once structure 12 has grown to a desired length, structure 12 may be severed from system 10. Feed mechanism 94 may thereafter be used to advance a start end of the reinforcement to the tool center or nip point of outlet 22.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A print head for an additive manufacturing system, comprising:
   an outlet configured to discharge a material;
   a compacting module mounted to trail behind the outlet during movement of the print head, the
   compacting module including a compacting device configured to compact the material;
   a biasing device configured to bias the compacting device against the material and to allow translation of the compacting device in a direction towards and away from the material;
   a locker configured to engage at least a portion of the compacting module to selectively lock translation of the compacting device; and
   an actuator coupled to the locker, the actuator being configured to move the locker between a first position in which the locker mechanically engages with the at least a portion of the compacting module to selectively lock translation of the compacting device, and a second position in which is locker is mechanically disengaged with the at least the portion of the compacting module.

2. The print head of claim 1, wherein:
   the compacting device, when unlocked, has a range of motion; and
   the range of motion is adjustable between non-zero ranges.

3. The print head of claim 2, further including:
   a first limiter configured to inhibit motion of the compacting device past a first end point away from the material; and
   a second limiter configured to inhibit motion of the compacting device past a second end point toward the material,
   wherein a location of at least one of the first and second limiters is adjustable.

4. The print head of claim 3, wherein the location of each of the first and second limiters is adjustable.

5. The print head of claim 3, further including an actuator configured cause adjustment of the at least one of the first and second limiters.

6. A print head for an additive manufacturing system, comprising:
   an outlet configured to discharge a material;
   a compacting device mounted to trail behind the outlet during movement of the print head in a normal direction;
   a biasing device configured to bias the compacting device against the material and to allow movement of the compacting device in a direction towards and away from the material;
   a locker configured to selectively lock a position of the compacting device; and
   a controller programmed to automatically cause the locker to lock the position of the compacting device during transition between a first printing operation and a second printing operation.

7. The print head of claim 6, wherein:
   the first printing operation corresponds with printing of overlapping layers; and
   the second printing operation corresponds with printing unsupported in free space.

8. The print head of claim 6, further including a sensor configured to generate a signal indicative of a characteristic of the material after discharge and prior to compacting, wherein the controller is configured to selectively activate the locker based on the signal.

9. A print head for an additive manufacturing system, comprising:
   an outlet configured to discharge a material;
   a compacting device configured to compact the material after discharge;
   a locker configured to mechanically engage the compacting device to lock a position of the compacting device relative to the material; and
   a controller configured to cause the locker to lock the position of the compacting device during transition between a first printing operation and a second printing operation.

10. The print head of claim 9, wherein the controller is further configured to unlock the position of the compacting device during a start of a third printing operation.

11. The print head of claim 9, wherein:
the first printing operation corresponds with printing of overlapping layers; and the second printing operation corresponds with printing unsupported in free space.

12. The print head of claim 9, wherein the compacting device is moveable within a range during compaction of the material when the locker is unlocked.

13. The print head of claim 12, wherein the compacting device is biased toward the material.

14. The print head of claim 9, wherein the compacting device is biased toward the material.

15. The print head of claim 9, further including:
   a sensor configured to detect a characteristic of the material after discharge and prior to compaction; and
   the controller is configured to selectively activate the locker based on the sensor.

16. A print head for an additive manufacturing system, comprising:
   an outlet configured to discharge a material;
   a compacting device moveable within a range to compact the material after discharge;
   an actuator including a device configured to mechanically engage with a portion of the compacting device, the actuator being configured to move the device between a first position in which the device mechanically engages with at least a portion of the compacting device to selectively lock translation of the compacting device, and a second position in which the device mechanically disengages with the at least the portion of the compacting device.

17. The print head of claim 16, wherein the device is a locker configured to selectively lock the compacting device at a position within a range of positions.

18. The print head of claim 16, further including a controller configured to activate the actuator during a transition between a first printing operation and a second printing operation.

19. The print head of claim 16, wherein the compacting device is biased toward the material.

20. The print head of claim 16, wherein the compacting device includes a roller, and the at least the portion of the compacting device is spaced apart from the roller.

* * * * *